(12) United States Patent
Ved (10) Patent No.: US 11,036,877 B2
(45) Date of Patent: Jun. 15, 2021

(54) SYSTEMS AND METHODS FOR CONTROLLING ACCESS TO INFORMATION STORED IN AN INFORMATION RETENTION SYSTEM

(71) Applicant: Veritas Technologies LLC, Mountain View, CA (US)

(72) Inventor: Amber Ved, San Jose, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 271 days.

(21) Appl. No.: 16/208,282

(22) Filed: Dec. 3, 2018

(65) Prior Publication Data
US 2020/0175184 A1 Jun. 4, 2020

(51) Int. Cl.
| | |
|---|---|
| G06F 21/62 | (2013.01) |
| G06F 16/23 | (2019.01) |
| G06F 3/06 | (2006.01) |
| G06F 16/182 | (2019.01) |
| H04L 29/06 | (2006.01) |
| H04L 29/08 | (2006.01) |

(52) U.S. Cl.
CPC .......... *G06F 21/6218* (2013.01); *G06F 3/067* (2013.01); *G06F 16/182* (2019.01); *G06F 16/2379* (2019.01); *H04L 63/105* (2013.01); *H04L 67/1097* (2013.01); *G06F 2221/2113* (2013.01); *G06F 2221/2141* (2013.01)

(58) Field of Classification Search
CPC ..... G06F 2221/2141; G06F 2221/2113; G06F 3/067; G06F 16/182; G06F 16/185; G06F 21/6218; G06F 16/2379; H04L 63/105; H04L 67/1097
See application file for complete search history.

(56) References Cited

U.S. PATENT DOCUMENTS

| | | | |
|---|---|---|---|
| 8,230,484 B1 * | 7/2012 | Wiese ................... | H04L 63/104 726/3 |
| 9,836,357 B1 | 12/2017 | Wilk et al. | |
| 2005/0240572 A1 * | 10/2005 | Sung ....................... | G06F 16/93 |
| 2005/0251508 A1 * | 11/2005 | Shimizu .............. | H04L 67/1097 |

(Continued)

OTHER PUBLICATIONS

International Search Report and Written Opinion received for PCT Application Serial No. PCT/US2019/064065 dated Feb. 19, 2020, 8 pages.

*Primary Examiner* — Thaddeus J Plecha
(74) *Attorney, Agent, or Firm* — FisherBroyles, LLP (57) ABSTRACT

The disclosed computer-implemented method for controlling access to information stored in an information retention system may include (1) receiving, at a computing device, metadata associated with an object type of respective objects, where at least two of the respective objects are in different domains, (2) determining, from the metadata, the respective object types of at least two objects, (3) forming a hierarchy of the at least two objects based on relative features of the respective object types, and (4) performing a security action comprising (A) receiving at least one access rule controlling access by at least one user to the at least two objects and (B) storing, in at least one storage device in the information retention system, the at least one access rule, the hierarchy of the objects, and the at least two objects. Various other methods, systems, and computer-readable media are also disclosed.

20 Claims, 5 Drawing Sheets

(56) References Cited

U.S. PATENT DOCUMENTS

| | | | |
|---|---|---|---|
| 2005/0289109 A1* | 12/2005 | Arrouye | G06F 16/38 |
| 2006/0271915 A1* | 11/2006 | Stefik | H04L 9/3218 |
| | | | 717/127 |
| 2014/0310317 A1* | 10/2014 | Spillane | G06F 16/9027 |
| | | | 707/803 |
| 2016/0205081 A1* | 7/2016 | Simons | H04L 63/105 |
| | | | 715/743 |
| 2017/0185490 A1 | 6/2017 | Sridharan | |
| 2017/0315934 A1* | 11/2017 | Muhlestein | G06F 3/0659 |
| 2019/0303447 A1* | 10/2019 | Mohiuddin Khan | |
| | | | G06F 16/24578 |

\* cited by examiner

- type : "NetBackupBackupRoot"
- name : "?"
- [ ] children
  - { } 0
    - type : "DATACENTER"
    - name : "HQ-DC"
    - [ ] children
      - { } 0
        - type : "FOLDER"
        - name : "FinanceMachineFolder"
        - [ ] children
          - { } 0
            - type : "VMPOOL"
            - name : "FinVMs"
            - [ ] children
              - { } 0
                - type : "MACHINE"
                - name : "Fin_VM1"
                - [ ] children
                  - { } 0
                    - type : "DISK"
                    - name : "DISK1"
                    - [ ] children
                      - { } 0
                        - type : "FS_ROOT"
                        - name : "C:"
                        - [ ] children
  - { } 1
    - type : "FOLDER"
    - name : "R&DMachineFolder"
    - [ ] children
      - { } 0
        - type : "VMPOOL"
        - name : "R&DVMs"
        - [ ] children
          - { } 0
            - type : "Machine"
            - name : "R&D_TestDev"
            - [ ] children
          - { } 1
            - type : "Machine"
            - name : "R&D_AcvIP"
            - [ ] children

*FIG. 5*

SYSTEMS AND METHODS FOR CONTROLLING ACCESS TO INFORMATION STORED IN AN INFORMATION RETENTION SYSTEM

BACKGROUND

Backing-up information is a preventative security action that may hasten recovery efforts following malicious attacks on information systems. Backing-up information may be a challenging, complex, and important operation. Some of the complexities include defining and controlling access to backed-up information. For example, when only two employees are permitted to access important information backed-up many years ago and those two employees have left the company, then who should be permitted to access the backed-up information? Some other complexities include that similar backed-up applications may have different access models, different objects, different object placement, and/or different access rules. Moreover, some information storage systems may involve third-party service providers, such as cloud service providers, that may implement incompatible access management services. Further, as times change, users, roles of users, applications, roles of applications, computing technology, access control technology, and/or storage technology may change while backed-up data stored in information retention systems remains unchanged since being stored.

SUMMARY

As will be described in greater detail below, the instant disclosure describes various systems and methods for controlling access to information stored in an information retention system.

In one embodiment, a method for controlling access to information stored in an information retention system may include (1) receiving, at a computing device, metadata associated with an object type of respective objects in a plurality of objects, where at least two of the respective objects are in different domains, (2) determining, from the metadata, the respective object types of at least two objects in the plurality of objects, (3) forming a hierarchy of the at least two objects based on relative features of the respective object types, and (4) performing a security action. The security action may include (A) receiving at least one access rule controlling access by at least one user to the at least two objects in the plurality of objects and (B) storing, in at least one storage device in the information retention system, the at least one access rule, the hierarchy of the objects, and the at least two objects in the plurality of objects.

In an example, an object in the plurality of objects may describe at least one of a variable, a function, and a data structure. In an embodiment, an object in the plurality of objects may include a database table, a file, a folder, a database, or a combination thereof. In some embodiments, the at least two objects in the plurality of objects may be associated with different applications.

In some examples, determining the respective object types may further include comparing the metadata of the at least two objects to a cross-reference of metadata and object type. In an example, determining the respective object types may further include reading the respective object type from the metadata.

In an embodiment, the at least one access rule may enable access by the at least one user to at least one respective portion of the hierarchy. In some embodiments, enabling access by the at least one user to the at least one respective portion of the hierarchy may include enabling access to all levels of the hierarchy that are lower than the at least one respective portion of the hierarchy.

In some examples, the at least one access rule may deny access by the at least one user to at least one respective portion of the hierarchy. In an example, denying access by the at least one user to the at least one respective portion of the hierarchy may supersede enabling access by the at least one user to at least a part of the at least one respective portion of the hierarchy. In an embodiment, denying access by the at least one user to the at least one respective portion of the hierarchy may include denying reading, writing, deleting, and recovering at least one object in the at least one respective portion of the hierarchy.

In some embodiments, the at least one access rule may enable access by the at least one user to at least one object in the plurality of objects. In some examples, the at least one access rule may deny access by the at least one user to at least one object in the plurality of objects.

In an example, performing the security action may include (1) receiving additional access rules controlling access by the at least one user to at least one respective object in the plurality of objects and (2) combining at least a portion of the received access rules into at least one combined access rule.

In one example, a system for controlling access to information stored in an information retention system may include several modules stored in memory, including (1) a receiving module, stored in the memory, that receives metadata associated with an object type of respective objects in a plurality of objects, where at least two of the respective objects are in different domains, (2) a determining module, stored in the memory, that determines, from the metadata, the respective object types of at least two objects in the plurality of objects, (3) a forming module, stored in the memory, that forms a hierarchy of the at least two objects based on relative features of the respective object types, (4) a performing module, stored in the memory, that performs a security action. The security action may include (A) receiving at least one access rule controlling access by at least one user to the at least two objects in the plurality of objects and (B) storing, in at least one storage device in the information retention system, the at least one access rule, the hierarchy of the objects, and the at least two objects in the plurality of objects. The system may also include at least one physical processor that executes the receiving module, the determining module, the forming module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at the computing device, metadata associated with an object type of respective objects in a plurality of objects, where at least two of the respective objects are in different domains, (2) determine, from the metadata, the respective object types of at least two objects in the plurality of objects, (3) form a hierarchy of the at least two objects based on relative features of the respective object types, and (4) perform a security action. The security action may include (A) receiving at least one access rule controlling access by at least one user to the at least two objects in the plurality of objects and (B) storing, in at least one storage device in the information retention system, the at least one access rule, the hierarchy of the objects, and the at least two objects in the plurality of objects.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for controlling access to information stored in an information retention system. Examples of the provided techniques may provide a generic application-agnostic method to enable securely managing information stored in retention systems, such as long-term data retention systems. Examples of the provided techniques may provide a method for unified multi-application domain data access control in information retention systems, such as long-term data retention systems. In some embodiments, the provided techniques may enable backing-up different applications in a unified way by implementing a flexible hierarchical organization that spans different application domains and their application-specific objects.

Some of the problems addressed by the provided systems and methods may include (1) many enterprise software applications (e.g., operating systems, workloads such as virtualization, applications such as databases, etc.) define application-unique user access requirements and access rules to meet application-specific requirements, (2) many applications define and use different styles of objects, (3) back-up and long-term data protection applications may archive information with application permissions that, over time, grow out of synchronization with each other as applications evolve and thus leave older copies unmodified, (4) for application back-up operations, it is often desirable to maintain consistency of application data at a specific point in time, thus requiring back-up operations to be performed across different users at the same time and as a single user (e.g., saving data from all tables in a database in a single pass to maintain consistency), and/or (5) recovery time objectives (RTOs) in service level agreements (SLAB) may require enabling recovery of quantities of backed-up information that are smaller than an entire backed-up application.

Some examples of the provided systems and methods may analyze high-level software objects created and/or used by applications, such as tables in database applications, virtual machines in virtualization applications, and/or the like. The analysis results provide respective object characteristics that may be used to organize objects from different applications and/or different domains into a hierarchy such as a parent-child hierarchy. This method of organizing objects (1) need not match that of backed-up applications, (2) may be as high-level to low-level as may be detected and managed meaningfully, and/or (3) does not require individual application users or group information to be understood. Objects may be stored and the hierarchy may be stored. Data access rules (i.e., in rule-based access control (RBAC)) may be created and/or applied to control access to users and/or processing that accesses objects in the hierarchy. For example, an administrator may define that only certain users are permitted to access a first portion of the hierarchy, while all users are permitted to access another portion of the hierarchy. The provided techniques provide an approach that balances both (1) avoids strongly coupling the access models of the applications to the application's objects and (2) defines access control on a granular level to specific objects inside the applications.

By doing so, the systems and methods described herein may improve functioning of computing devices by managing backed-up information without being limited by application-unique user access requirements and access rules. Further, the systems and methods described herein may improve the functioning of computing devices by managing backed-up information without restraint by different styles of objects used by different applications. In some embodiments, the systems and methods described herein may improve functioning of computing devices by managing archived information without being affected by application permissions that, over time, grow out of synchronization with each other as applications evolve and leave older copies unmodified. Further, the systems and methods described herein may improve the functioning of computing devices by managing backed-up information without requiring back-up operations to be performed across different users at the same time and as a single user. In some embodiments, the systems and methods described herein may improve functioning of computing devices by managing archived information in a manner that enables recovering quantities of backed-up information that are smaller than that of an entire application, thus improving recovery times. Moreover, in some examples, from a perspective of applications, systems and methods described herein may appear transparent to applications.

Figure 1:
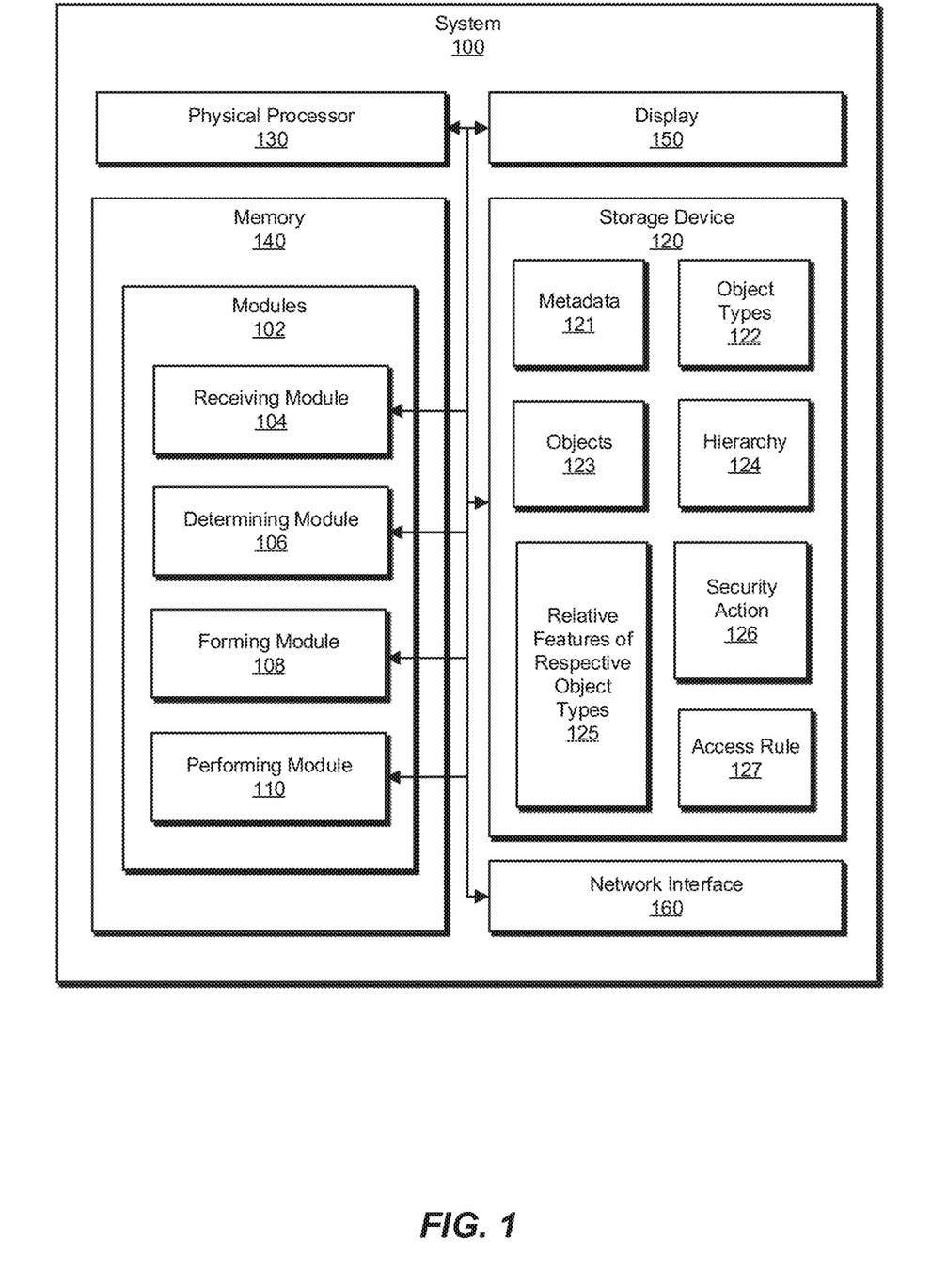
FIG. 1 is a block diagram of an example system for controlling access to information stored in an information retention system.
Figure 2:
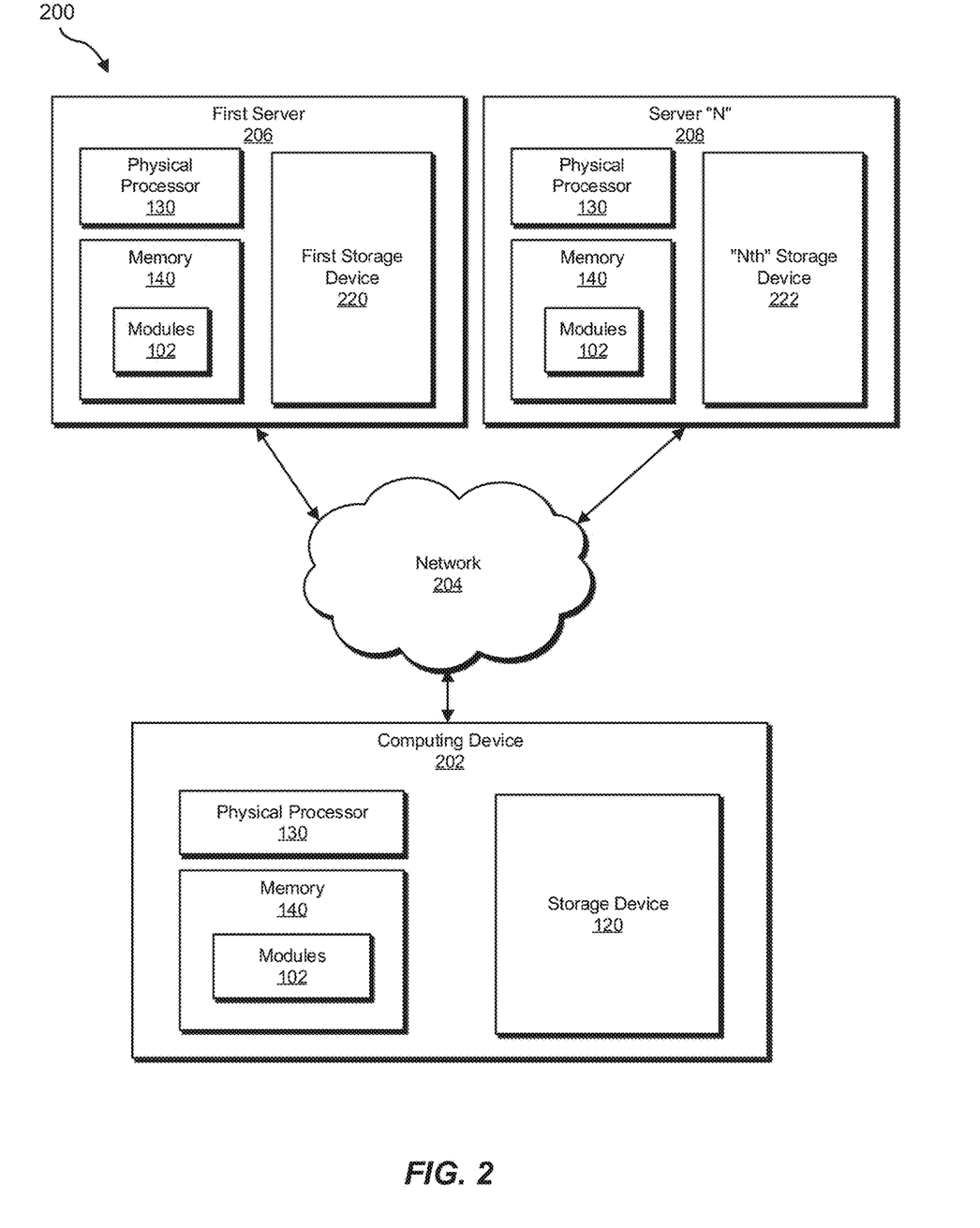
FIG. 2 is a block diagram of an additional example system for controlling access to information stored in an information retention system.
Figure 4:
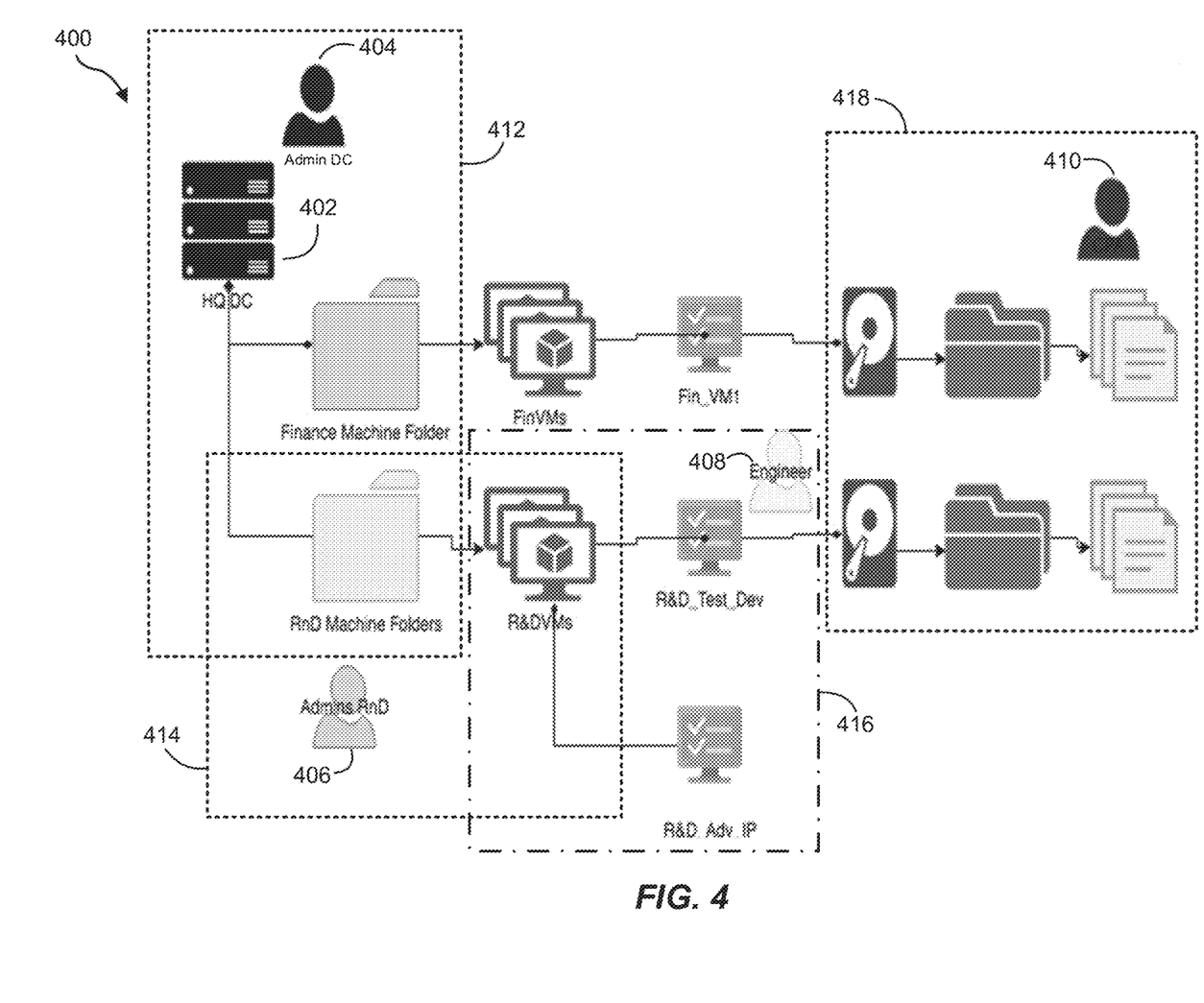
FIG. 4 is a block diagram of objects in an example information retention system.
Figure 5:
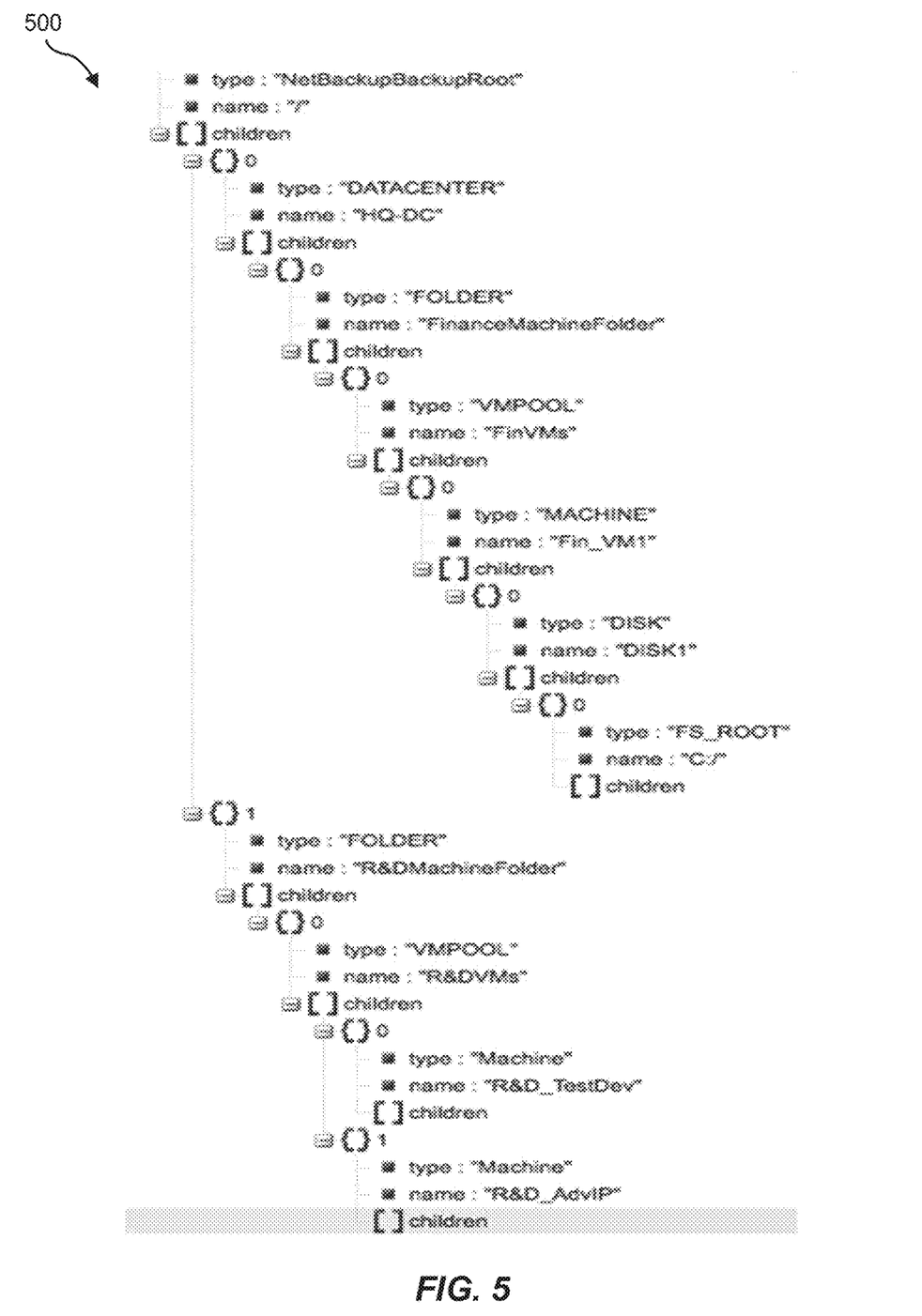
FIG. 5 is a diagram of an example hierarchy of objects in the example information retention system of FIG. 4.

The following will provide, with reference to FIGS. 1-2, detailed descriptions of example systems for controlling access to information stored in an information retention system. Detailed descriptions of corresponding computer-implemented methods will also be provided in connection with FIG. 3. In addition, detailed descriptions of an example information retention system and an associated hierarchy of objects are shown in FIGS. 4-5.

FIG. 1 is a block diagram of an example system 100 for controlling access to information stored in an information retention system. In some embodiments, example system 100 may be a constituent component of the information retention system. As illustrated in this figure, example system 100 may include one or more modules 102 for performing one or more tasks. As will be explained in greater detail below, modules 102 may include a receiving module 104, a determining module 106, a forming module 108, and a performing module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, and/or server "N" 208). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain one or more of metadata 121, object types 122, objects 123, hierarchy 124, relative features of respective object types 125, security action 126, and/or access rule 127. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some non-limiting embodiments, security action 126 may include blocking access to devices (e.g., storage devices, memories, network devices, etc.), allowing limited access to devices, allowing read-only access to devices, encrypting information, and/or other acts limiting access to devices. In some examples, security actions may be performed automatically. In some embodiments, security actions may be performed based on executing an access rule such as access rule 127.

In some embodiments, security action 126 may attempt to identify and/or ameliorate potential security risks. In additional examples, security action 126 may include displaying, on user displays, warnings indicating that access rule 127 has been violated. In some examples, security action 126 may further include allowing access to information that only authenticated processes and/or users may access. In some examples, security action 126 may be performed according to a data loss prevention (DLP) policy.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate controlling access to information stored in an information retention system. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, any other suitable storage memory, and/or variations or combinations of one or more of the same.

As illustrated in FIG. 1, example system 100 may also include one or more displays, such as display 150. In some examples, display 150 may be a touchscreen. Thus, display 150 may be a touch sensing device configured to receive input, such as swipes, via users' touches imparted by users on display 150 when users touch display 150. In some examples, display 150 may implement technologies such as capacitive sensing, resistive sensing, pressure sensing, etc. Display 150 may also be an image (e.g., video) display device configured to display a user interface which may display access rules, hierarchies, and/or objects.

As illustrated in FIG. 1, example system 100 may also include one or more network interfaces, such as network interface 160. Network interface 160 broadly represents any type or form of communication device or adapter capable of facilitating communication between example system 100 and one or more additional devices (e.g., network 204 in FIG. 2). For example, in certain embodiments network interface 160 may facilitate communication between example system 100 and a network coupled to computing systems such as cloud-based information storage systems. Examples of network interface 160 include, without limitation, a wired network interface (such as a network interface card), a wireless network interface (such as a wireless network interface card), a modem, and any other suitable interface. In at least one embodiment, network interface 160 may provide a direct connection to a remote server via a link to a network, such as the Internet. Network interface 160 may also indirectly provide such a connection through, for example, a local area network (such as an Ethernet network), a personal area network, a telephone or cable network, a cellular telephone connection, a satellite data connection, or any other suitable connection.

In certain embodiments, network interface 160 may also represent a host adapter configured to facilitate communication between example system 100 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Network interface 160 may also allow example system 100 to engage in distributed or remote computing and/or information storage. For example, network interface 160 may receive instructions from a remote device or send instructions to a remote device for execution.

Example system 100 in FIG. 1 may be implemented in a variety of ways. For example, all or a portion of example system 100 may represent portions of example system 200 in FIG. 2. As shown in FIG. 2, system 200 may include a computing device 202 in communication via a network 204 with first server 206 and/or server "N" 208. In one example, all or a portion of the functionality of modules 102 may be performed by computing device 202, first server 206, server "N" 208, and/or any other suitable computing system. As will be described in greater detail below, one or more of modules 102 from FIG. 1 may, when executed by at least one processor of computing device 202, first server 206 and/or server "N" 208, enable computing device 202, first server 206 and/or server "N" 208 to control access to information stored in a retention system. In some examples, system 200 may be an information retention system.

Computing device 202 generally represents any type or form of computing device capable of reading computer-executable instructions. For example, computing device 202 may represent a device running information storage management software. Additional examples of computing device 202 include, without limitation, laptops, tablets, desktops, servers, storage servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and servers 206-208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Servers 206-208 generally represent any type or form of computing device capable of reading computer-executable instructions. For example, servers 206-208 may represent a device running information storage management software. Additional examples of servers 206-208 include, without limitation, storage servers, database servers, application servers, and/or web servers configured to run certain software applications and/or provide various storage, database, and/or web services. Although illustrated as a single entity in FIG. 2, servers 206-208 may include and/or represent a plurality of servers that work and/or operate in conjunction with one another. In an example, servers 206-208 may be constituent components of a cloud-based information retention system.

In some examples, servers 206-208 may include and/or be coupled to one or more storage devices, such as first storage device 220 and/or "Nth" storage device 222. First storage device 220 and/or "Nth" storage device 222 may generally represent any type or form of volatile or non-volatile storage device or medium capable of storing information and/or computer-readable instructions. Examples of first storage device 220 and/or "Nth" storage device 222 may include, without limitation, RAM, ROM, flash memory, HDDs, SSDs, optical disk drives, caches, storage memory, any other suitable storage devices and/or variations or combinations of one or more of the same.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
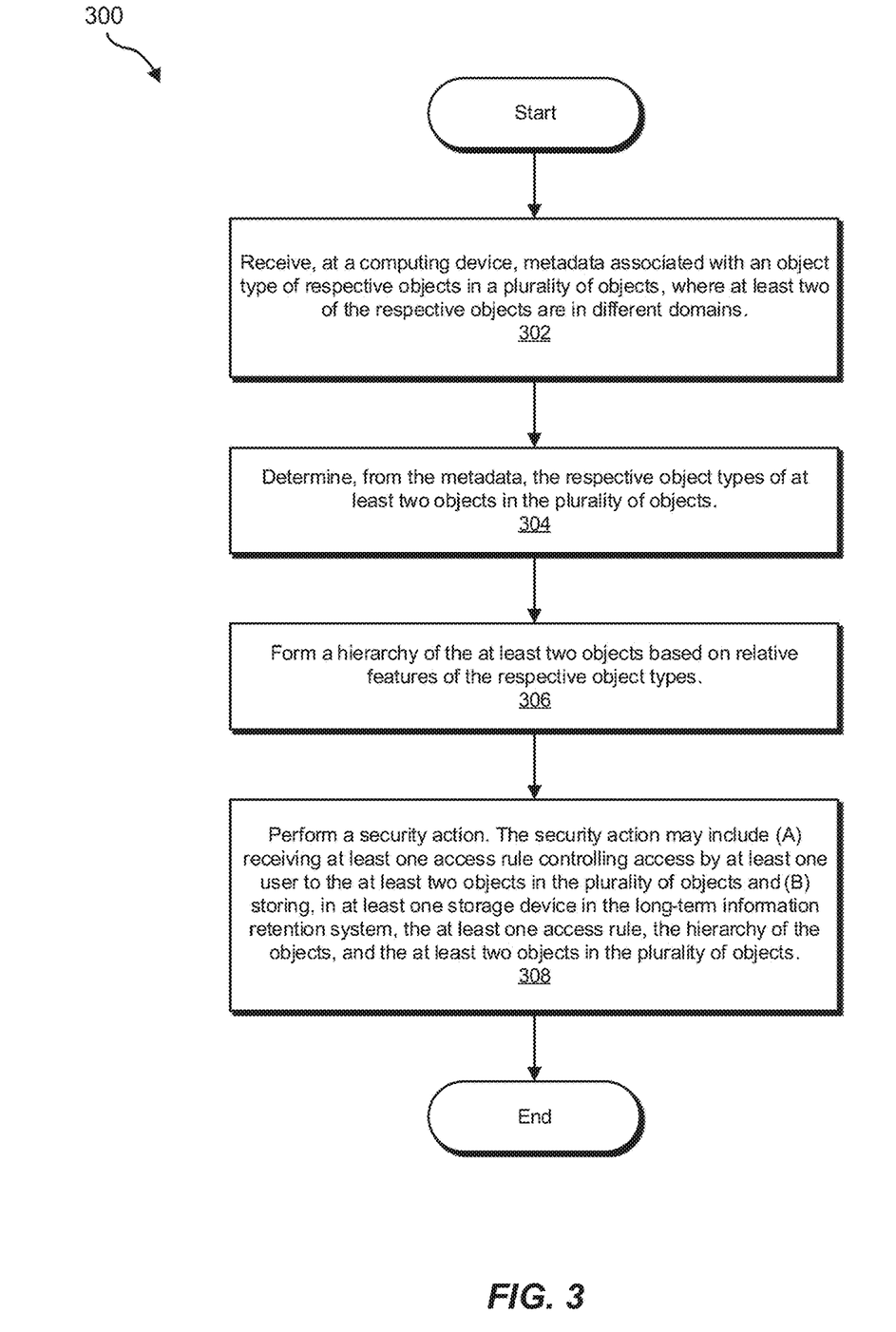
FIG. 3 is a flow diagram of an example method for controlling access to information stored in an information retention system.

FIG. 3 is a flow diagram of an example computer-implemented method 300 for controlling access to information stored in an information retention system. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive metadata associated with object types of respective objects in pluralities of objects. In examples, at least two of the respective objects may be in different domains. In some examples, the metadata may assist in establishing that the respective objects belong in a specific folder, file, table, or other portion, construct, and/or division of a hierarchy. The systems described herein may perform step 302 in a variety of ways. For example, receiving module 104 may, as part of computing device 202, server 206, and/or server "N" 208 in FIG. 2, receive metadata 121 associated with object types 122 of respective objects 123 in a plurality of objects. In examples, at least two of respective objects 123 may be in different domains.

In one example, an object in the plurality of objects may describe at least one of a variable, a function, and/or a data structure. In an example, an object in the plurality of objects may include a database table, a file, a folder, a database, or a combination thereof. In an embodiment, the at least two objects in the plurality of objects may be from different applications.

As illustrated in FIG. 3, at step 304 one or more of the systems described herein may determine, from metadata, respective object types of at least two objects in pluralities of objects. The systems described herein may perform step 304 in a variety of ways. For example, determining module 106 may, as part of computing device 202, server 206, and/or server "N" 208 in FIG. 2, determine, from metadata 121, respective object types 122 of at least two objects 123 in the plurality of objects.

In one example, determining the respective object types may include comparing the metadata of the at least two objects to a cross-reference of metadata and object type. In an example, determining the respective object types may include reading the respective object type from the metadata.

In some examples, the method may include defining substitute (e.g., faux) data access objects that are application-pertinent and related to respective objects in applications. Respective object types may be determined as a part of the defining process.

As illustrated in FIG. 3, at step 306 one or more of the systems described herein may form hierarchies of at least two objects based on relative features of the respective object types. The systems described herein may perform step 306 in a variety of ways. For example, forming module 108 may, as part of computing device 202, server 206, and/or server "N" 208 in FIG. 2, form hierarchy 124 of at least two objects 123 based on relative features of the respective object types 125. In an example, hierarchies may cross different domains and be combinations of objects in a pseudo order stored as metadata enabling an intermediate or full path. FIGS. 4-5 depict an example of a hierarchy created across multiple domains and associated rule-based access control.

Returning to FIG. 3, in one example, a hierarchy for a file system may include a combination of files and folders. In another example, a hierarchy for a virtual machine may include a combination of datacenters, folders, clusters, and/or labels. In a non-limiting embodiment, a hierarchy crossing multiple domains may include (1) a cloud storage system as the highest level in the hierarchy, (2) a datacenter in the cloud storage system and a first domain, (3) a first virtual machine in the datacenter and the first domain, (4) a first folder in the first virtual machine and the first domain, (5) a file in the first folder and the first domain, and (6) a second virtual machine in the first folder, the first domain, and a second domain. The second domain may include (7) an operating system storage in the second virtual machine, (8) a second folder in the operating system storage, and (9) files in both the second folder and a third domain.

As illustrated in FIG. 3, at step 308 one or more of the systems described herein may perform security actions, such as using the hierarchies to establish rule-based information access control across multiple domains and/or different identity providers (IDPs). In some embodiments, security actions may include (A) receiving at least one access rule controlling access by at least one user to at least two objects in the pluralities of objects and/or (B) storing, in at least one storage device in information retention systems, the at least one access rule, hierarchies of the objects, and/or the at least two objects in the plurality of objects. The systems described herein may perform step 308 in a variety of ways. For example, performing module 110 may, as part of computing device 202, server 206, and/or server "N" 208 in FIG. 2, perform security action 126. In some embodiments, security action 126 may include (A) receiving at least one access rule 127 controlling access by at least one user and/or process to at least two objects 123 in the plurality of objects and/or (B) storing, in at least one storage device in the information retention system (e.g., storage device 120, first storage device 220, and/or "Nth" storage device 222), at least one access rule 127, hierarchy 124 of objects 123, and/or at least two objects 123 in the plurality of objects. In some examples, permissions may vary by access rule.

In some examples and in a simplified manner, an access rule may state that user "X" may access "Y" portion of the hierarchy. For example, a first rule may state that user one may read and/or recover specific file one represented by object one in the hierarchy. As a further example, a second rule may state that an administrator may recover a folder of which file one is a constituent file, but the administrator may not read file one.

In an embodiment, the at least one access rule may enable access by the at least one user to at least one respective portion of the hierarchy. In some embodiments, enabling access by the at least one user to the at least one respective portion of the hierarchy may include enabling access to all levels of the hierarchy that are lower than the at least one respective portion of the hierarchy. In some embodiments, enabling access by the at least one user to the at least one respective portion of the hierarchy may include allowing reading, writing, deleting, and/or recovering at least one object in the at least one respective portion of the hierarchy.

In an example, the at least one access rule may deny access by the at least one user to at least one respective portion of the hierarchy. In an embodiment, denying access by the at least one user to the at least one respective portion of the hierarchy may supersede enabling access by the at least one user to at least a part of the at least one respective portion of the hierarchy. In some embodiments, denying access by the at least one user to the at least one respective portion of the hierarchy may include denying reading, writing, deleting, and/or recovering at least one object in the at least one respective portion of the hierarchy.

In some examples, the at least one access rule may enable access by the at least one user to at least one object in the plurality of objects. In some embodiments, the at least one access rule may deny access by the at least one user to at least one object in the plurality of objects.

In some embodiments, access rules controlling access by the at least one user may provide a default level of access. For example, a default level of access by a user may include enabling access to a specific group of objects and/or levels of the hierarchy. In some examples, a default level of access by a user may include denying access to a specific group of objects and/or levels of the hierarchy.

In an example, performing the security action may include receiving additional access rules controlling access by the at least one user to at least one respective object in the plurality of objects. In some embodiments, performing the security action may include combining at least a portion of the received access rules into at least one combined access rule.

FIG. 4 is a block diagram of an example information retention system 400. Information retention system 400 may include a datacenter 402 providing an information retention system including computing devices and/or storage devices storing information such as the depicted objects. Users such as "Admin DC" 404, "Admins RnD" 406, engineer 408, and/or "CPA" 410 may, as provided by respective access rules, access certain objects in information retention system 400. Information retention system 400 includes multiple domains—a first domain is a "Finance Machine Folder" and a second domain is "RnD Machine Folders."

For example, a datacenter administrator such as "Admin DC" 404 may be granted access by a first rule to restore a certain group of objects represented by first box 412. The first rule enables sufficient access by "Admin DC" 404 for "Admin DC" 404 to perform datacenter administration tasks, without enabling "Admin DC" 404 to access trade secret information in the R&D Adv IP object.

As a further example, an administrator for a research and development department "Admins RnD" 406 may be granted access by a second rule to restore a certain group of objects represented by second box 414. The second rule enables sufficient access by "Admins RnD" 406 for "Admins RnD" 406 to perform research and development department administration tasks, without enabling "Admins RnD" 406 to access trade secret information in the R&D Adv IP object.

Moreover, engineer 408 may be granted access by a third rule to access a certain group of objects represented by third box 416. The third rule enables sufficient access by engineer 408 for engineer 408 to perform research and development tasks, without enabling engineer 408 to access finance department information in the FIN_VM1 object.

As a further example, accountant "CPA" 410 may be granted access by a fourth rule to access a certain group of objects represented by fourth box 418. The fourth rule enables sufficient access by "CPA" 410 for "CPA" 410 to perform accounting tasks, without enabling "CPA" 410 to access trade secret information in the R&D Adv IP object.

In another embodiment, datacenter administrator "Admin DC" 404 may be denied access by a fifth rule to the group of objects represented by third box 416. The fifth rule enables sufficient access by "Admin DC" 404 for "Admin DC" 404 to perform datacenter administration tasks, while explicitly denying "Admin DC" 404 to access trade secret information in the R&D Adv IP object.

In another embodiment, datacenter administrator "Admin DC" 404 may be denied access by a sixth rule to the group of objects represented by second box 414. The sixth rule may supersede access granted to "Admin DC" 404 by the first rule. Thus, despite being granted access by rule one to the object "RnD Machine Folders," datacenter administrator "Admin DC" 404 may not restore the object "RnD Machine Folders" due to being denied access by superseding rule six.

FIG. 5 is a diagram of an example hierarchy 500 of objects in example information retention system 400. Hierarchy 500 is an example of a hierarchy of objects across multiple domains.

As detailed above, the steps outlined in method 300 in FIG. 3 and the examples of FIGS. 4-5 may provide systems and methods for controlling access to information stored in an information retention system. By doing so, the systems and methods described herein may improve functioning of computing devices by managing backed-up information without being limited by application-unique user access requirements, access rules, different styles of objects used by different applications, and/or out-of-sync application permissions. In some embodiments, the systems and methods described herein may improve functioning of computing devices by managing archived information in a manner that enables recovering quantities of backed-up information that are smaller than that of an entire application, thus improving recovery times.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for controlling access to information stored in an information retention system, at least a portion of the method being performed by a computing device comprising at least one processor, the method comprising:
   receiving, at the computing device, metadata associated with an object type of respective objects in a plurality of objects, wherein:
      each object of the plurality of objects is included in a respective folder included in a respective virtual machine and domain, each respective virtual machine being included in a datacenter of the information retention system; and
      at least two of the respective objects are included in a different respective virtual machine and domain;
   determining, from the metadata, the respective object types of the at least two objects in the plurality of objects;
   forming a hierarchy of the at least two objects based on relative features of the respective object types; and
   performing a security action comprising:
      receiving at least one access rule controlling access by at least one user to the at least two objects in the plurality of objects; and
      storing, in at least one storage device in the information retention system, the at least one access rule, the hierarchy of the objects, and the at least two objects in the plurality of objects.

2. The computer-implemented method of claim 1, wherein an object in the plurality of objects describes at least one of a variable, a function, and a data structure.

3. The computer-implemented method of claim 1, wherein an object in the plurality of objects comprises a database table, a file, a folder, a database, or a combination thereof.

4. The computer-implemented method of claim 1, wherein the at least two objects in the plurality of objects are associated with different applications.

5. The computer-implemented method of claim 1, wherein determining the respective object type for each of the at least two objects comprises comparing the metadata of the at least two objects to a cross-reference of metadata and object type.

6. The computer-implemented method of claim 1, wherein determining the respective object type for each of the at least two objects further comprises reading the respective object type from the metadata.

7. The computer-implemented method of claim 1, wherein the at least one access rule enables access by the at least one user to at least one respective portion of the hierarchy.

8. The computer-implemented method of claim 7, wherein enabling access by the at least one user to the at least one respective portion of the hierarchy comprises enabling access to all levels of the hierarchy that are lower than the at least one respective portion of the hierarchy.

9. The computer-implemented method of claim 1, wherein the at least one access rule denies access by the at least one user to at least one respective portion of the hierarchy.

10. The computer-implemented method of claim 9, wherein denying access by the at least one user to the at least one respective portion of the hierarchy supersedes enabling access by the at least one user to at least a part of the at least one respective portion of the hierarchy.

11. The computer-implemented method of claim 9, wherein denying access by the at least one user to the at least one respective portion of the hierarchy comprises denying reading, writing, deleting, and recovering at least one object in the at least one respective portion of the hierarchy.

12. The computer-implemented method of claim 1, wherein the at least one access rule enables access by the at least one user to at least one object in the plurality of objects.

13. The computer-implemented method of claim 1, wherein the at least one access rule denies access by the at least one user to at least one object in the plurality of objects.

14. The computer-implemented method of claim 1, wherein performing the security action further comprises:
   receiving additional access rules controlling access by the at least one user to at least one respective object in the plurality of objects; and
   combining at least a portion of the received additional access rules with the at least one access rule to create at least one combined access rule.

15. A system for controlling access to information stored in an information retention system, the system comprising:
   a receiving module, stored in memory, that receives metadata associated with an object type of respective objects in a plurality of objects, wherein:
      each object of the plurality of objects is included in a respective folder included in a respective virtual machine and domain, each respective virtual machine being included in a datacenter of the information retention system; and at least two of the respective objects are included in a different respective virtual machine and domain;
a determining module, stored in the memory, that determines, from the metadata, the respective object types of the at least two objects in the plurality of objects;
a forming module, stored in the memory, that forms a hierarchy of the at least two objects based on relative features of the respective object types;
a performing module, stored in the memory, that performs a security action comprising:
receiving at least one access rule controlling access by at least one user to the at least two objects in the plurality of objects; and
storing, in at least one storage device in the information retention system, the at least one access rule, the hierarchy of the objects, and the at least two objects in the plurality of objects; and
at least one physical processor that executes the receiving module, the determining module, the forming module, and the performing module.

16. The system of claim 15, wherein the at least one access rule denies access by the at least one user to at least one respective portion of the hierarchy.

17. The system of claim 15, wherein performing the security action further comprises:
receiving additional access rules controlling access by the at least one user to at least one respective object in the plurality of objects; and
combining at least a portion of the received additional access rules with the at least one access rule to create at least one combined access rule.

18. A non-transitory computer-readable medium comprising one or more computer-executable instructions that, when executed by at least one processor of a computing device, cause the computing device to:
receive, at the computing device, metadata associated with an object type of respective objects in a plurality of objects, wherein:
each object of the plurality of objects is included in a respective folder included in a respective virtual machine and domain, each respective virtual machine being included in a datacenter of an information retention system; and
at least two of the respective objects are included in a different respective virtual machine and domain;
determine, from the metadata, the respective object types of the at least two objects in the plurality of objects;
form a hierarchy of the at least two objects based on relative features of the respective object types; and
perform a security action comprising:
receiving at least one access rule controlling access by at least one user to the at least two objects in the plurality of objects; and
storing, in at least one storage device in the information retention system, the at least one access rule, the hierarchy of the objects, and the at least two objects in the plurality of objects.

19. The non-transitory computer-readable medium of claim 18, wherein the at least one access rule denies access by the at least one user to at least one respective portion of the hierarchy.

20. The non-transitory computer-readable medium of claim 18, wherein performing the security action further comprises:
receiving additional access rules controlling access by the at least one user to at least one respective object in the plurality of objects; and
combining at least a portion of the received additional access rules with the at least one access rule to create at least one combined access rule.

* * * * *